United States Patent
Sick

(10) Patent No.: US 12,441,482 B2
(45) Date of Patent: Oct. 14, 2025

(54) FUEL TANK FOR AN AIRCRAFT

(71) Applicant: Airbus Operations SAS, Toulouse (FR)

(72) Inventor: Frédéric Sick, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 78 days.

(21) Appl. No.: 18/480,064

(22) Filed: Oct. 3, 2023

(65) Prior Publication Data

US 2024/0116649 A1    Apr. 11, 2024

(30) Foreign Application Priority Data

Oct. 7, 2022    (FR) ......................................... 2210281

(51) Int. Cl.
    *B64D 37/08*    (2006.01)
(52) U.S. Cl.
    CPC .................................. *B64D 37/08* (2013.01)
(58) Field of Classification Search
    CPC .................................................... B64D 37/08
    USPC .................................................... 220/62, 562
    See application file for complete search history.

(56) References Cited

U.S. PATENT DOCUMENTS

| | | | | |
|---|---|---|---|---|
| 2,703,607 | A * | 3/1955 | Simmonds | B64D 37/08 |
| | | | | 222/394 |
| 8,496,270 | B2 * | 7/2013 | Nothof | B60P 3/00 |
| | | | | 280/837 |
| 2003/0015536 | A1 * | 1/2003 | Tekulve | B62D 49/0671 |
| | | | | 220/562 |
| 2005/0166967 | A1 | 8/2005 | Howe | |
| 2009/0050743 | A1 * | 2/2009 | Barbosa | B64D 37/08 |
| | | | | 244/135 R |
| 2011/0272526 | A1 | 11/2011 | Barbosa et al. | |
| 2012/0205005 | A1 * | 8/2012 | White | B01F 35/50 |
| | | | | 220/562 |
| 2021/0347252 | A1 | 11/2021 | Giambartolomei | |

FOREIGN PATENT DOCUMENTS

| | | | | |
|---|---|---|---|---|
| DE | 102012014272 | A1 * | 1/2014 | ........... B29D 22/003 |
| EP | 2384972 | A2 * | 11/2011 | ............. B64C 17/10 |
| RU | 2323134 | C1 | 4/2008 | |

OTHER PUBLICATIONS

French Search Report for corresponding French Patent Application No. 2210281 dated Apr. 28, 2023; priority document.

* cited by examiner

*Primary Examiner* — Orlando E Aviles
*Assistant Examiner* — Niki M Eloshway
(74) *Attorney, Agent, or Firm* — Greer, Burns & Crain, Ltd.

(57) ABSTRACT

A fuel tank for an aircraft, including a fuel pumping system which includes a set of hoses, first ends of which are distributed over a lower part of the tank, a manifold to which second ends of the different hoses of the set of hoses are connected as input, an output of the manifold being connected to a fuel pump, a fuel level sensor associated with each hose of the set of hoses and placed in the vicinity of the first end of said hose, and a valve associated with each hose and controlled by a control system which is configured such that when the fuel level sensor associated with this hose detects a low fuel level, the valve is controlled into a closed position, and otherwise the valve is controlled into an open position.

8 Claims, 2 Drawing Sheets

FUEL TANK FOR AN AIRCRAFT

CROSS-REFERENCES TO RELATED APPLICATIONS

This application claims the benefit of the French patent application No. 2210281 filed on Oct. 7, 2022, the entire disclosures of which are incorporated herein by way of reference.

FIELD OF THE INVENTION

The invention relates to the field of the storage of fuel on board an aircraft.

BACKGROUND OF THE INVENTION

An aircraft generally comprises at least one fuel tank provided for storing kerosene or liquid hydrogen, in particular for supplying an aircraft propulsion system with energy. Such a tank is, for example, of elongate form, for example of cylindrical form. A fuel pump is generally associated with the tank so as to allow fuel to be provided to a user system such as a propulsion engine or a fuel cell. To this end, the fuel pump is connected to a hose as input, a free end of which is situated in a lower part of the tank. When the aircraft is on the ground or when it is flying horizontally, the tank is generally in a horizontal position. As long as there is still fuel in the tank, the free end of the hose is covered by fuel in such a way that the pump does not risk drawing in air. However, in certain phases of flight of the aircraft, in particular in a takeoff phase, in a landing phase, or during maneuvers of the aircraft, the aircraft and the tank may be inclined. The free end of the hose may then not be covered by fuel and the pump then risks drawing in air; this should be avoided, on the one hand, to avoid deterioration of the pump, and, on the other hand, to allow the user system to continue to be supplied with fuel.

SUMMARY OF THE INVENTION

It is notably an aim of the present invention to provide a solution to this problem. The invention relates to a fuel tank for an aircraft, comprising a fuel pumping system in the tank. The tank is noteworthy in that the fuel pumping system comprises:
  a set of hoses comprising at least two hoses, a first end of each hose being disposed in a lower part of the tank, the first ends of the different hoses of the set of hoses being distributed over the lower part of the tank;
  a fuel pump;
  a manifold to which second ends of the different hoses of the set of hoses are connected as input, an output of the manifold being connected to the fuel pump;
  a set of fuel level sensors such that a fuel level sensor is associated with each hose of the set of hoses and is placed in the vicinity of the first end of the hose; and
  a valve associated with each hose, this valve being controlled by a control system in such a way that when the fuel level sensor associated with this hose detects a low fuel level, the valve is controlled into a closed position, and otherwise the valve is controlled into an open position.

Thus, when the first end of one of the hoses is not covered by fuel due to an inclination of the tank, the fuel level sensor associated with this hose detects a low fuel level and the valve associated with this hose is controlled into the closed position by the control system. This makes it possible to avoid air being drawn in through the first end of the hose. In addition, since the first ends of the different hoses are distributed over the lower part of the tank, as long as there is still fuel in the tank, the end of at least one of the hoses is covered by fuel. Consequently, the valve associated with this hose is controlled into the open position by the control system, and this ensures that a user system continues to be provided with fuel.

According to various embodiments, which may be taken in isolation or in combination:
  the tank is of elongate form along a length of the tank and the set of hoses comprises at least four hoses including a first hose whose first end is situated in the vicinity of a first end of the length, a second hose whose first end is situated in the vicinity of a second end of the length, opposite the first end of the length, and two other hoses whose first ends are situated on either side of the middle of the length of the tank. As used herein the term "vicinity of" means close to, such as "in the vicinity of a first end of the length" means close to the first end of the length, preferably closer to the first end of the length than to a center of the length, more preferably, at the first end or within about 10% of the length from the first end. Similar meanings of "vicinity of" should be applied to other uses of "vicinity of". Advantageously, the first ends of the two other hoses are also situated on either side of a longitudinal axis of the tank;
  the lower part of the tank is shaped so as to have a low point at the location of the first end of at least one of the hoses of the set of hoses;
  the tank comprises a partition which partially covers the lower part of the tank and which is spaced apart from a lower wall of the tank in such a way that the first ends of the hoses and the level sensors are situated between the lower wall of the tank and the partition. In particular, the partition is equipped with a valve provided to allow gas contained between the lower wall of the tank and the partition to be discharged to an upper part of the tank;
  the tank comprises a set of walls each extending between the partition and the lower tank wall. In particular, the walls of the set of walls delimit sub-volumes of the tank between the partition and the lower wall of the tank, the number of sub-volumes being equal to the number of hoses of the set of hoses.

The invention also relates to an aircraft comprising such a tank.

BRIEF DESCRIPTION OF THE DRAWINGS

The invention will be better understood upon reading the following description and upon studying the appended figures.

DETAILED DESCRIPTION OF THE PREFERRED EMBODIMENTS

Figure 2:
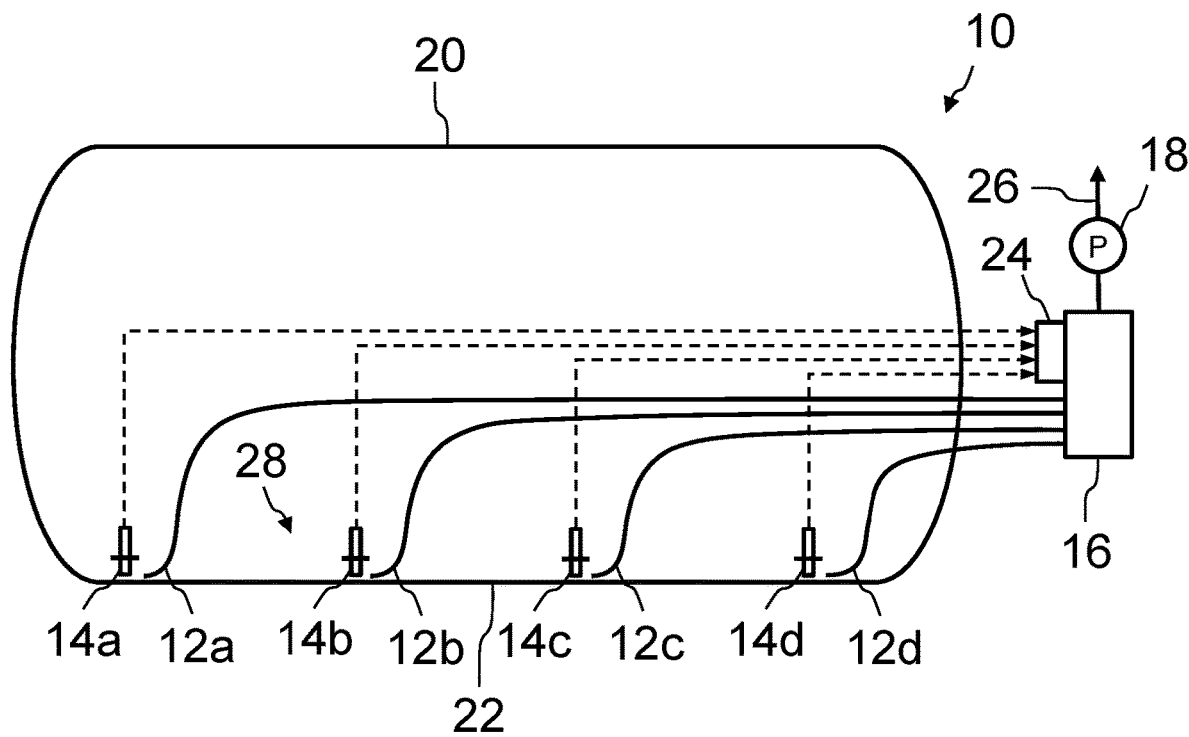
FIG. 2 is a functional diagram of a fuel tank according to one embodiment of the invention.

The tank 10 shown in FIG. 2 comprises a shell 20 provided for storing fuel, in particular kerosene or hydrogen.

When the fuel corresponds to hydrogen, the latter is, for example, stored in the liquid state in the tank 10, at a temperature lower than or equal to −253° C. The tank 10 is then referred to as a double-shell cryogenic tank, comprising an inner shell and an outer shell between which a thermal insulator is disposed. The shell 20 shown in FIG. 2 then corresponds to the inner shell of the tank. In the figure, the tank is shown in a position corresponding to the one it occupies when the aircraft is on the ground or when the aircraft is flying horizontally. A lower wall 22 of the shell of the tank is then horizontal or substantially horizontal.

The tank 10 comprises a set of hoses comprising at least two hoses 12a, 12d, a first end of each hose being disposed in a lower part 28 of the tank, the first ends of the different hoses of the set of hoses being distributed over the lower part 28 of the tank.

The tank 10 also comprises a fuel pump 18 and a manifold 16 to which second ends of the different hoses 12a, 12d of the set of hoses are connected as input, an output of the manifold being connected to the fuel pump 18.

The tank 10 also comprises a set of fuel level sensors 14a, 14d. A fuel level sensor is associated with each hose 12a, 12d of the set of hoses and is placed in the vicinity of the first end of the hose.

The tank 10 further comprises a control system 24. The control system 24 is connected to different level sensors 14a, 14d as input. The tank 10 also comprises a valve associated with each hose, this valve being controlled by the control system 24 in such a way that when the fuel level sensor 14a, 14d associated with this hose detects a low fuel level, the valve is controlled into the closed position, and otherwise the valve is controlled into the open position. According to a first alternative, the different valves are incorporated into the manifold 16, as in the embodiment shown in FIG. 2. They are not shown in the figure so as to not complicate it. According to another alternative, the valves are mounted in series on the hoses with which they are associated.

During operation, when the aircraft is in a substantially horizontal position, whether it be in flight or on the ground, the lower wall 22 and the lower part 28 of the tank are horizontal or substantially horizontal. Consequently, as long as there is still a sufficient amount of fuel in the tank, the first ends of the different hoses 12a, 12d of the set of hoses are covered by fuel and none of the level sensors 14a, 14d detects a low fuel level. Consequently, the control system 24 controls the different valves associated with these hoses into the open position, in such a way that when the pump 18 is in operation, fuel is drawn in from the tank through each of the hoses. The fuel reaches the pump 18 via the hoses 12a, 12d and the manifold 16. At the output of the pump, the fuel is transferred to the user system via a pipe 26.

When the tank 10 is inclined due to an inclination of the aircraft in certain phases of flight of the aircraft, the first end of at least one of the hoses is no longer covered by fuel. The level sensor associated with this hose then detects a low fuel level. Consequently, the control system 24 controls the closure of the valve associated with this hose. Consequently, when the pump 18 is in operation, air does not risk being drawn in through the first end of the hose. This makes it possible to ensure the good operation of the pump and of the user system since the pump 18 does not risk drawing in air. On the other hand, since the tank is inclined and the first ends of the different hoses 12a, 12d are distributed over the lower part 28 of the tank, the first end of at least one of the hoses of the set of hoses is covered by fuel. Consequently, as has already been explained when the tank 10 is in a horizontal position, the valve associated with this hose is controlled into the open position by the control system 24 and the pump 18 draws in fuel from the tank through the hose. This makes it possible to ensure that the user system continues to be provided with fuel.

In a particular embodiment, as illustrated in FIG. 2, the shell 20 of the tank is of elongate form along a length of the tank, in particular of cylindrical form, closed at its ends by two domes. The set of hoses comprises, for example, four hoses 12a, 12b, 12c, 12d. The first end of a first hose 12a is situated in the vicinity of a first end of the length. The first end of a second hose 12d is situated in the vicinity of a second end of the length, opposite the first end of the length. The first ends of the two other hoses 12b and 12c are situated on either side of the middle of the length of the tank, between the first ends of the first hose 12a and of the second hose 12d. The first ends of the different hoses of the set of hoses are thus distributed over the lower part 28 of the tank along its length, thus making it possible to ensure that the first end of at least one of the hoses is always covered by fuel when the tank 10 is inclined and there is still a sufficient amount of fuel in the tank. In particular, the first ends of the two other hoses 12b and 12c are also situated on either side of a longitudinal axis of the tank (that is to say on either side of the plane of the figure). This makes it possible to ensure that the first end of at least one of the two other hoses 12b, 12c is always covered by fuel when the tank 10 is inclined laterally (for example due to a roll movement of the aircraft) and there is still a sufficient amount of fuel in the tank.

Figure 3:
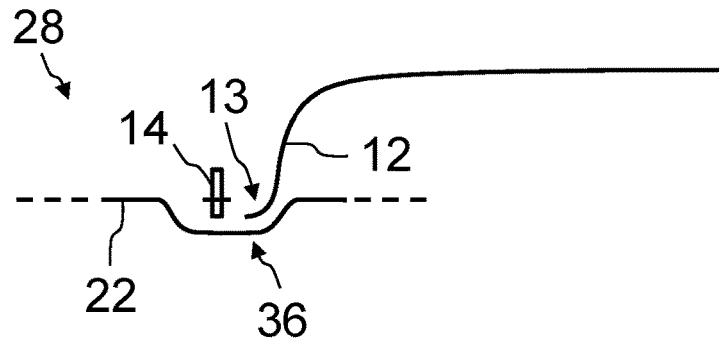
FIG. 3 is a detail view of the lower part of the tank, illustrating a particular embodiment of the invention.

In the embodiment illustrated in FIG. 3, the lower part 28 of the tank is shaped so as to have a low point 36 at the location of the first end 13 of at least one of the hoses 12 of the set of hoses 12a . . . 12d. In particular, the low point 36 corresponds to a downwardly oriented boss, created in the lower wall 22 of the tank 10. Preferably, the low point is shaped to receive the first end 13 of the hose 12, and also at least a lower part of the level sensor 14 associated with this hose. Having such a low point 36 at the location of the first end of the hose 12 makes it possible to facilitate the convergence of the fuel towards the first end of the hose, even when there is only a little fuel remaining in the tank.

Figure 4:
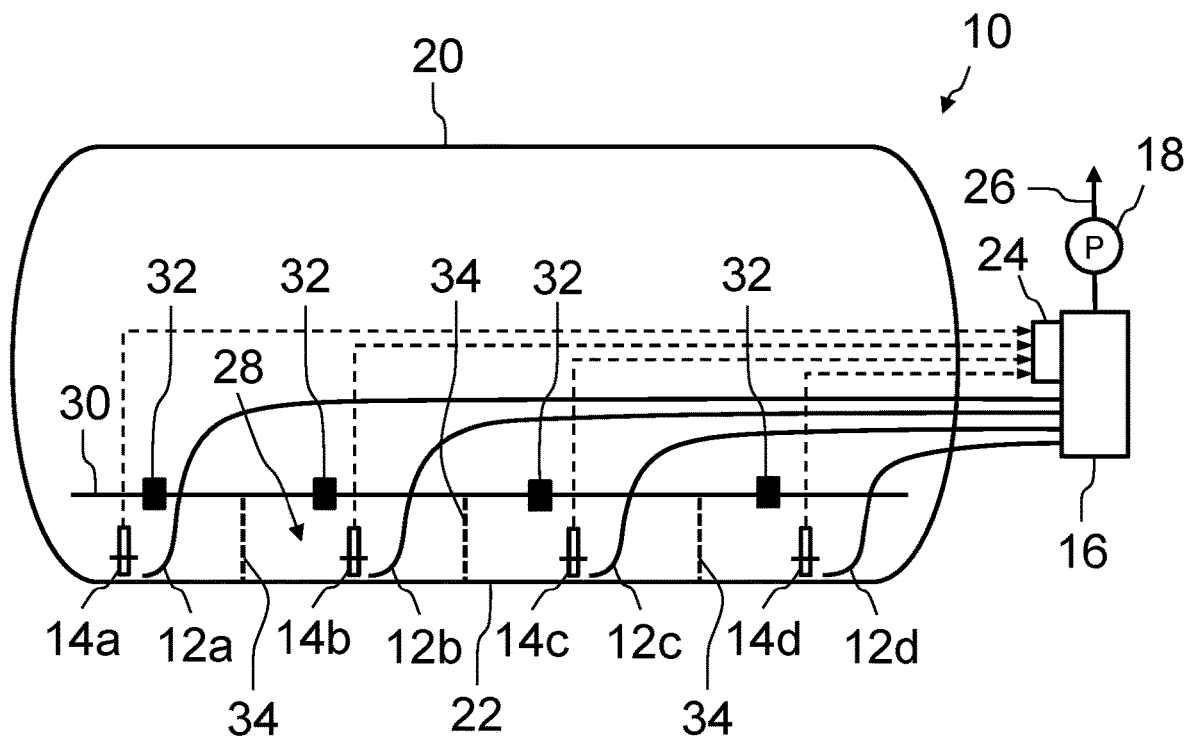
FIG. 4, similarly to FIG. 2, is a functional diagram of a fuel tank according to one embodiment of the invention.

In one embodiment illustrated in FIG. 4, the tank comprises a partition 30 which partially covers the lower part 28 of the tank and which is spaced apart from the lower wall 22 of the tank in such a way that the first ends of the hoses and the level sensors are situated between the lower wall 22 of the tank and the partition 30. The purpose of the partition 30 is to prevent the fuel contained under this partition from moving abruptly upwards in the event of a rapid reduction in the force of gravity which may occur during the flight of the aircraft, or even when the fuel is subjected to an upwardly oriented acceleration force. By virtue of this partition 30, the fuel is then kept in the lower part 28 of the tank such that the first end of at least one of the hoses remains covered by the fuel. This makes it possible to ensure that fuel continues to be pumped by the pump 18 and therefore the user system continues to be provided with fuel. The partition 30 only partially covers the lower part 28 of the tank, so as to allow the lower part to be filled with fuel. In particular, the partition 30 is not contiguous with the shell 20 of the tank such that the fuel is able to flow between this shell 20 and an edge of the partition 30 in order to fill the lower part 28 of the tank. Preferably, the partition 30 is equipped with at least one valve 32 provided to allow gas contained between the lower wall 22 of the tank and the partition 30 to be discharged to an upper part of the tank. This makes it possible to avoid the accumulation of gas in the lower part 28 of the tank, under the partition 30, in particular due to evaporation of a portion of the fuel. This contributes further to ensuring that the first end of at least one of the hoses remains covered by the fuel and therefore to ensuring that fuel continues to be pumped by the pump 18 and therefore the user system continues to be provided with fuel. In a particular embodiment, the tank comprises a set of walls 34, each extending between the partition 30 and the lower wall 22 of the tank. These walls 34 make it possible to avoid abrupt movements of the fuel in the lower part 28 of the tank during movements of the aircraft. They therefore contribute to preventing the first ends of certain hoses from no longer being covered by fuel in such a situation. In particular, the walls of the set of walls 34 delimit sub-volumes of the tank between the partition 30 and the lower wall 22 of the tank, the number of sub-volumes being equal to the number of hoses of the set of hoses, as illustrated in FIG. 4. Advantageously, the walls 34 do not delimit these sub-volumes in an airtight manner, such that the fuel is able to be distributed between these sub-volumes, but without abrupt movements. To this end, certain walls comprise, for example, orifices allowing the circulation of fuel, or the tank comprises walls 34 which are offset so as to allow the fuel to be distributed between the sub-volumes while still limiting abrupt movements of the fuel along the length of the tank.

Figure 1:
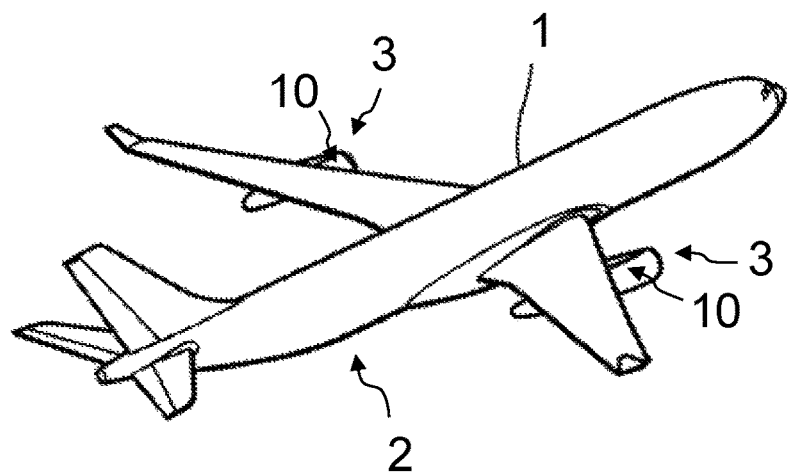
FIG. 1 illustrates an aircraft equipped with a fuel tank.

In a way which does not limit the invention, the fuel tank 10 is for example incorporated into a nacelle of a propulsion engine 3 of the aircraft 1, as shown in FIG. 1. This engine is then either a combustion engine using the fuel as energy source, or an electric motor electrically supplied by fuel cells using the fuel, in particular hydrogen, as energy source. In another exemplary embodiment, the fuel tank 10 is incorporated into a fuselage 2 of the aircraft, in particular into a rear part of the fuselage.

The systems and devices described herein may include a controller, control unit, control device, control system, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel tank for an aircraft, comprising a fuel pumping system in said tank, wherein the fuel pumping system comprises:
   a set of hoses comprising at least two hoses, a first end of each hose being disposed in a lower part of the tank, the first ends of the different hoses of the set of hoses being distributed over the lower part of the tank;
   a fuel pump;
   a manifold to which second ends of the different hoses of the set of hoses are connected as input, an outlet of the manifold being connected to the fuel pump;
   a set of fuel level sensors such that a fuel level sensor is associated with each hose of the set of hoses and is placed in the vicinity of the first end of said hose; and
   a valve associated with each hose, this valve being controlled by a control system configured such that when the fuel level sensor associated with this hose detects a low fuel level, the valve is controlled into a closed position, and otherwise the valve is controlled into an open position,
   wherein the tank comprises a partition which partially covers the lower part of the tank and which is spaced apart from a lower wall of the tank in such a way that the first ends of the hoses and the level sensors are situated between the lower wall of the tank and the partition, such that the partition does not contact the lower wall of the tank, and wherein the tank comprises a set of walls, each extending from the partition to the lower wall of the tank.

2. The tank according to claim 1, wherein the tank is of elongate form along a length of said tank and the set of hoses comprises at least four hoses including a first hose whose first end is situated in the vicinity of a first end of said length, a second hose whose first end is situated in the vicinity of a second end of said length, opposite the first end of said length, and two other hoses whose first ends are situated on either side of the middle of the length of the tank.

3. The tank according to claim 2, wherein the first ends of the two other hoses are also situated on either side of a longitudinal axis of the tank.

4. The tank according to claim 1, wherein the lower part of the tank is shaped so as to have a low point at a location of the first end of at least one of the hoses of the set of hoses.

5. The tank according to claim 1, wherein the partition is equipped with a valve provided to allow gas contained between the lower wall of the tank and said partition to be discharged to an upper part of the tank.

6. The tank according to claim 1, wherein the walls of the set of walls delimit sub-volumes of the tank between the partition and the lower wall of the tank, the number of sub-volumes being equal to the number of hoses of the set of hoses.

7. An aircraft comprising a tank according to claim 1.

8. A fuel tank for an aircraft, comprising a fuel pumping system in said tank, wherein the fuel pumping system comprises:
- a set of hoses comprising at least two hoses, a first end of each hose being disposed in a lower part of the tank, the first ends of the different hoses of the set of hoses being distributed over the lower part of the tank;
- a fuel pump;
- a manifold to which second ends of the different hoses of the set of hoses are connected as input, an outlet of the manifold being connected to the fuel pump;
- a set of fuel level sensors such that a fuel level sensor is associated with each hose of the set of hoses and is placed in the vicinity of the first end of said hose; and
- a valve associated with each hose, this valve being controlled by a control system configured such that when the fuel level sensor associated with this hose detects a low fuel level, the valve is controlled into a closed position, and otherwise the valve is controlled into an open position, wherein the tank comprises a partition which partially covers the lower part of the tank and which is spaced apart from a lower wall of the tank in such a way that the first ends of the hoses and the level sensors are situated between the lower wall of the tank and said partition, such that the partition is equipped with a valve provided to allow gas contained between the lower wall of the tank and said partition to be discharged to an upper part of the tank.

* * * * *